United States Patent [19]

Kelly

[11] Patent Number: 4,460,855

[45] Date of Patent: Jul. 17, 1984

[54] LINEAR MOTOR

[76] Inventor: Hugh-Peter G. Kelly, 66 Westleigh Ave., Leigh on Sea, Essex, England

[21] Appl. No.: 264,394

[22] Filed: May 18, 1981

[30] Foreign Application Priority Data

May 19, 1980 [GB] United Kingdom ............... 8016410

[51] Int. Cl.³ ............................................. H02K 41/03
[52] U.S. Cl. ...................................... 318/135; 310/12
[58] Field of Search .................. 318/135, 685, 687; 310/27, 13, 12, 15, 14

[56] References Cited

U.S. PATENT DOCUMENTS

| 342,666 | 5/1886 | Williams | 310/14 |
|---|---|---|---|
| 405,194 | 6/1889 | Williams | 310/14 |
| 2,483,895 | 10/1949 | Fisher | 318/135 |
| 2,640,955 | 6/1953 | Fisher | 310/13 |
| 4,151,447 | 4/1979 | Von der Heide et al. | 318/135 |
| 4,315,171 | 2/1982 | Shaeffer | 310/12 |

Primary Examiner—B. Dobeck
Assistant Examiner—Arthur G. Evans
Attorney, Agent, or Firm—Fleit, Jacobson, Cohn & Price

[57] ABSTRACT

A linear motor comprises an armature and a stator each adapted to provide a sequence of North and South poles along the length of the motor. The pole pitch of the stator magnets is different from that of the armature coils such that with appropriate energization of the coils this difference in pole pitch and stator can result in a net thrust of the armature relative to the stator in a desired direction at any location within a range of relative longitudinal positions of the armature and stator. The motor may be subject to closed loop velocity—and/or positional control and means are disclosed to achieve this. Several variations in pole configurations and means of controlling the coil energization are disclosed.

20 Claims, 5 Drawing Figures

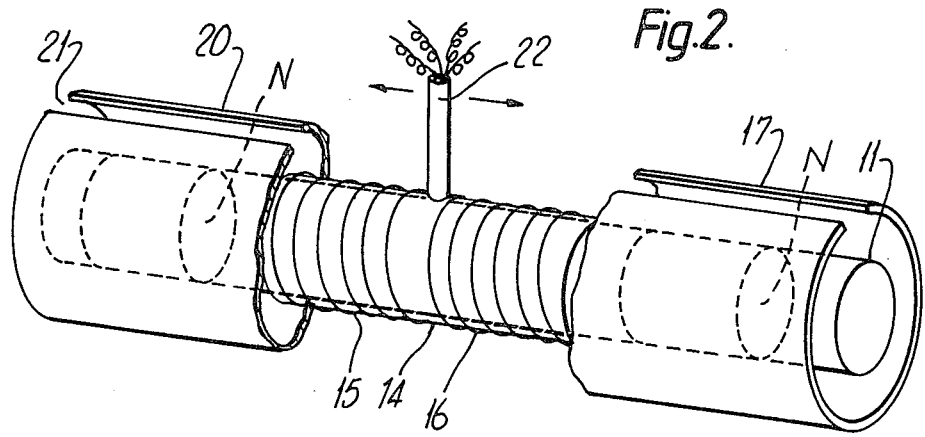
Fig. 2.
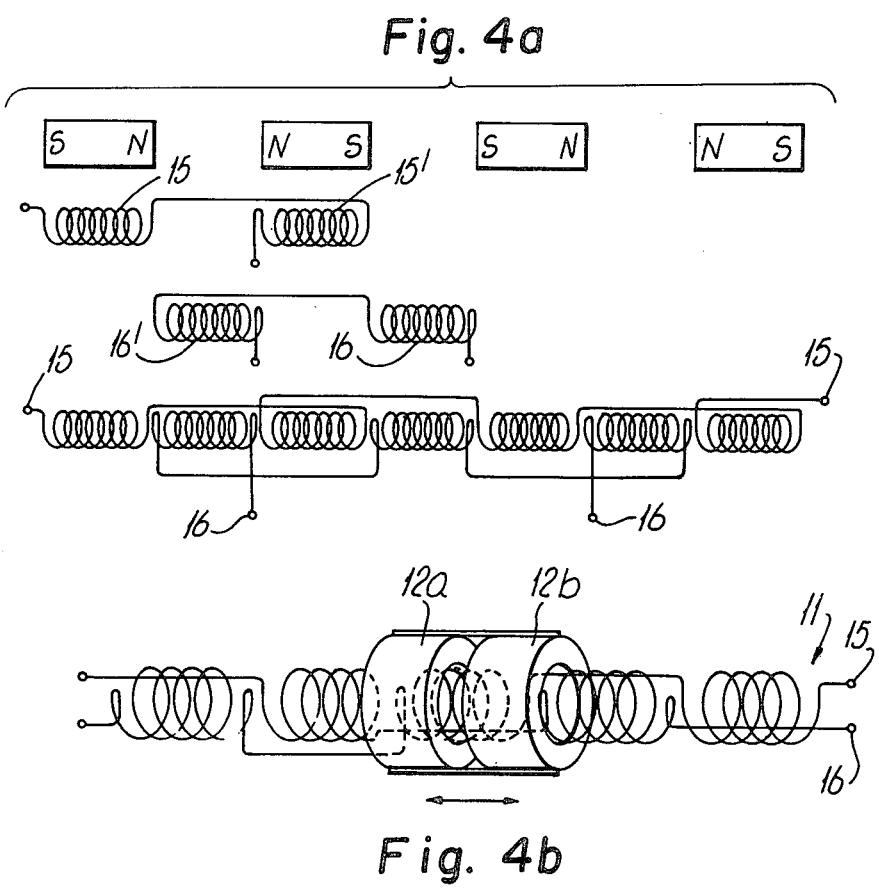
Fig. 4a
Fig. 4b

LINEAR MOTOR

DESCRIPTION

The present invention relates to electrodynamic machines of the type known as linear motors.

Linear motors are currently used in a wide variety of applications. They vary in type from powerful inductance motors utilising polyphase alternating currents, to small stepper motors comprising toothed stators stepping past slotted or toothed armatures, or vice-versa. Typical applications for the former type are in the field of transport, or for moving heavy goods, and for the latter, in the positioning of small electro-mechanical assemblies, such as are found in printers.

The availability of sophisticated electronic control techniques has made use of linear motors in certain applications particularly attractive on account of the reduction of moving parts they make possible when replacing conventional means of obtaining motion. However, certain forms of linear motor, such as the polyphase alternating current linear motor, or the multi-coil stepper motor, necessarily contain considerable quantities of copper, iron and other materials. Furthermore, the armature or moving part of these motors is often bulky, and this may hamper use in applications where rapid acceleration or deceleration is desirable. Thus, in applications where fast response is important and costs of manufacture must be kept to a minimum, alternative forms of obtaining linear motion are desirable.

According to the present invention, there is provided a linear motor comprising an armature and a stator each adapted to provide a sequence of north and south poles along the length of the motor, at least one of the armature and stator having at least two coils to produce the poles thereof, and means to enable the energisation of said coils, the pole pitches of the stator and the armature being different from one another such that with appropriate energisation of said coils by said means the difference in pole pitch of the armature and stator can result, in use, in a net thrust of the armature relative to the stator in a desired direction at any location within a range of relative longitudinal positions of the armature and stator.

The armature coils may have circuitry connected thereto to energise them with D.C. currents which are appropriately controlled by electronic or electromechanical means as the relative position of the armature and stator varies, to maintain the desired direction of thrust. Alternatively, where the fields of the stator and armature are provided by coils supplied by alternating current, thrust in a chosen direction may be maintained by appropriately varying the relative phase relationship between the currents to the coils of the armature and stator as the relative positions of the stator and rotor change. In addition, where the coils of the stator and armature are appropriately connected to a multiphase A.C. source, the direction of thrust for a given phase relationship can be altered by changing over the phases supplied to the coils. In both the D.C. and A.C. cases, the applied coil currents, or phase relationship, may be suitably modified so that a desired thrust profile is achieved, either in terms of the relative position of the armature and stator or of the travelling time between two relative positions.

The sources used to energise the coils may be current or voltage sources.

A desired thrust characteristic may also be achieved by applying to the coils pulses of appropriate duration, whose amplitude and pulse rate may be appropriately modulated to achieve such a desired thrust characteristic.

In an embodiment described hereinafter with reference to the drawings, a linear motor comprises a stator providing along its length a first sequence of magnetic fields, an armature for providing along its length a second sequence of magnetic fields to interact with the first sequence but being spaced apart other than the pole pitch of the first sequence, and control means responsive to the relative position of the armature and stator to regulate the various fields in such manner that, in use, for any one potentially stable magnetic interaction of a pair or more of armature and stator fields, further interaction of the remaining fields causes an offset, in the desired direction of movement, of the stable interaction such that change of the aforesaid stable magnetic interaction causes further relative movement in the same direction between the armature and stator. Once further relative movement occurs, another pair or pairs of stable interactions of fields occurs, but is/are displaced by other unstable interactions and so the process is continued to obtain movement in the desired direction.

In a first form of the invention, the stator comprises a longitudinal series of coaxial permanent magnets regularly spaced one from the other and in a NSNS . . . (i.e. unlike poles facing one another) sequence, and the armature comprises two or more cylindrical coils or sets of coils coaxially surrounding the magnets for movement therealong and which are spaced apart from one another by a pitch substantially not corresponding to the distance between the magnets, control means being provided to supply currents to the coils according to their position relative to the stator in such a sequence and direction that whenever energisation of a first coil or set of coils causes movement thereof to a stable position, energisation of the other coil(s) offsets the first coil(s) from the stable position in the direction of movement. (The NSNS . . . sequence may alternatively be obtained from a magnet having NS poles regularly spaced along its length, formed as a single magnet or as a succession of magnets placed adjacent to one another.) To enhance the thrust available from this arrangement considerably, a ferromagnetic shroud may be placed around the coils and magnets, so providing a tubular air gap along which the coils may move.

In a second form of the invention, the permanent magnet poles of the stator are also regularly spaced one from another, but are in a NSSNNSSNS . . . sequence, i.e. like poles facing one another.

It will be appreciated that in these arrangements, where free running of the motor is desired, some form of commutation or equivalent method of control is necessary to regulate the currents supplied to the coils. This may be provided in a number of ways. Wipers attached to the coils and passing over conductive strips may be employed, for example, or reed relays which are selectively operative when passing over the permanent magnet pole pieces may be used. In a preferred form, however, detection of the position of the coils is obtained from a combination of a light source and one or more photocells attached to the armature and traversing a graticule which is fixed relative to the stator, or vice-versa. Undulations in the output of the photocell(s) may be used to operate logic circuits with corresponding counters, the outputs of which are cyclical to effect the necessary changes in the currents supplied to the various coils as they pass over the permanent magnets. A weighting factor derived from the value within a counter at any one moment may be applied to the corresponding coil current(s) to improve linearity of thrust imparted by the armature. Normally, the stator and armature will each have more than one pole pair, with the pole pairs being provided in a repeating pattern along the length of the motor. In a special case, however, only one of the armature and stator has only one pole pair, the other having two or more pole pairs arranged in a repeating pattern. In those circumstances, the pitch of the single pole pair differs from the repeat length of the multiple pole-pair pattern. [It should be noted that it is not possible within the scope of the present invention for both armature and stator to have only one pole pair since it will not then be possible to ensure that relative movement in a desired direction from a stable relative position can occur by controlling the coil current.]

The invention will now be described by way of example only, with reference to FIGS. 1 to 5 in which:

FIGS. 1(a),(b),(c) and (d) are schematic representations of component parts of two forms of linear motor embodying the present invention;

FIG. 2 shows a cut-away portion in perspective view of part of the motor;

FIG. 4 shows wiring patterns and a further form of the linear motor; and

For ease of understanding, an explanation first follows of the physical construction of the motor, after which is given an explanation of the theory behind its operation.

Figure 1A:
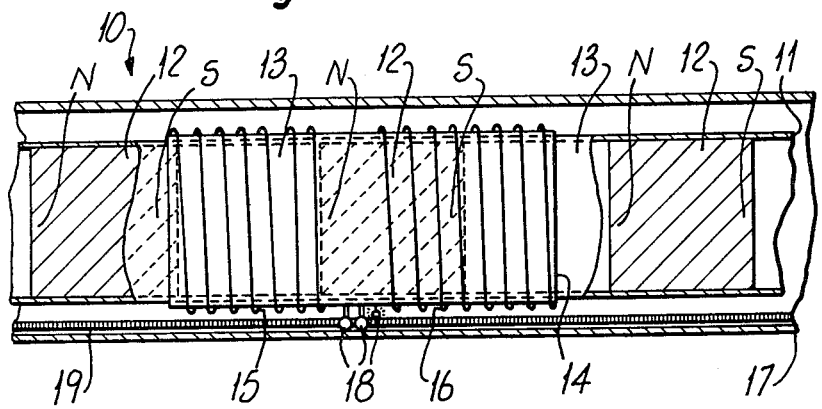

Referring to FIG. 1(a), a first form of linear motor embodying the invention is generally depicted at 10. The motor is comprised of three main parts, all coaxial with one another. The innermost of these, the stator which defines the range of movement of the motor, is a non-magnetic tube 11 in which are housed permanent magnets, 12, spaced from each other by non-magnetic blocks 13 equal in length to the magnets. (Hereinafter, this length will be referred to as a unit length.) The magnets lie in a NSNS . . . sequence. The middle part is a slidable collar 14 on which are wound two coils 15 and 16. This combination forms the armature of the motor which is relatively short compared with the stator. The coils are each substantially equal in extent longitudinally of the motor to the length of the permanent magnets, but are spaced apart by only a half pole pitch of the magnets. Surrounding the tube 11 and the collar 14 is a further, ferromagnetic, tube 17. Flux from the poles of each magnet radiates radially outwards to the tube 17 to complete a series of magnetic circuits; see FIG. 1(c). Note, in one form of construction, the blocks 13 and coils 15 and 16 may be slightly longer than the magnets, to optimise the interactive flux pattern.

Figure 1B:
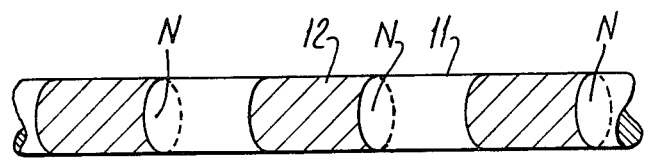
Figure 1C:
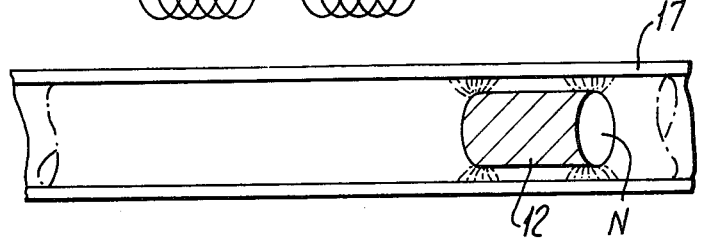

(The main component parts of FIG. 1(a), are shown again in FIGS. 1(b) and (c) at 11, 12, 15, 16, and 17 for clarity.)

A light source/photo-cell combination 18 is shown in FIG. 1(a) affixed to the slidable collar 14. This traverses afixed graticule 19 running along the length of the motor. The output from the photo-cell is used to detect the position of the coils relative to the stator, as will be explained hereinafter in more detail.

Figure 1D:
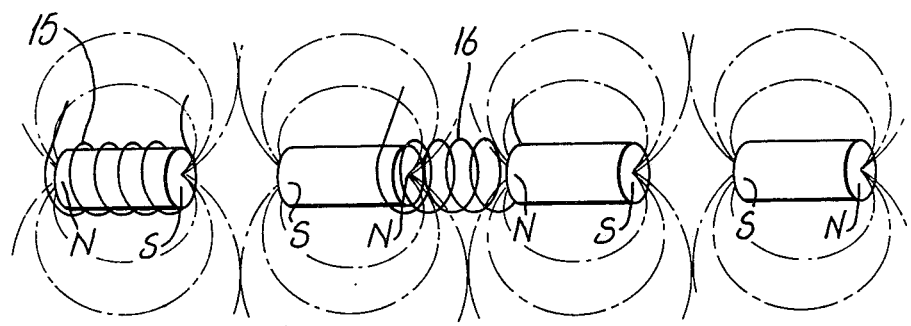

Referring to FIG. 1(d), a second and important form of linear motor embodying the invention is shown at 20. In this form, the permanent magnets are arranged in a NSSNNSSN . . . sequence and are again evenly spaced. The coils 15 and 16 however are separated by two unit lengths as opposed to the half unit length shown in FIG. 1(a). This form of the motor will be described in more detail later.

Referring now to FIG. 2, a perspective view of a practical realisation of the motor of FIGS. 1(a) and (b), is shown at 20. The outer tube 17 is shown cut away to reveal the tube 11, the slidable collar 14 and the coils 15 and 16. It will be appreciated that in FIG. 1(a) no indication is given as to how motion of the armature may be conveyed to a driven part. In practice, a longitudinal slot 21 is provided along the tube 17, and a periscopic member 22, affixed to the collar 14, protrudes therethrough for imparting thrust. The member 22 also conveys power cables to the coils from an outside source.

The action of the motor of FIGS. 1(a) and (b) will now be described, in a first mode of operation, with reference to FIGS. 3(i)–(v), in which stator permanent magnets along the motor are represented by the bars 23, 24, 25 and 26, and the two coils are shown at 15 and 16.

Consider first FIG. 3(i). As shown, the coils 15 and 16 are in a stable state, with coil 15 being energised, the North (N) and South (S) poles of 15 respectively attracting the S and N poles of 23. To obtain the first movement, coil 15 is unenergised and 16 is energised to produce N and S poles. These repel respectively the N and S poles of 23 and 24, but attract the S and N poles of 24. The armature therefore moves to the right; see (ii). Next, coil 16 is unenergised, but coil 15 is again energised, this time to produce S and N poles. These repel respectively the S and N poles of 23, but respectively attract the N and S poles of 23 and 24. The armature therefore again moves to the right and coil 15 straddles the air gap between 23 and 24; see (iii). Coil 16 is then energised S N, so causing, in similar fashion, movement to the right to the position shown in (iv). Finally, coil 15 is energised N S to cause movement to the right to the position shown at (v), and a cycle is completed. As described, it will be appreciated that energisation of either coil causes movement both as a result of attraction to one set of poles as well as repulsion against another. Reversal of the polarities of the above sequence, starting with coil 16, causes movement to the left.

Figure 3:
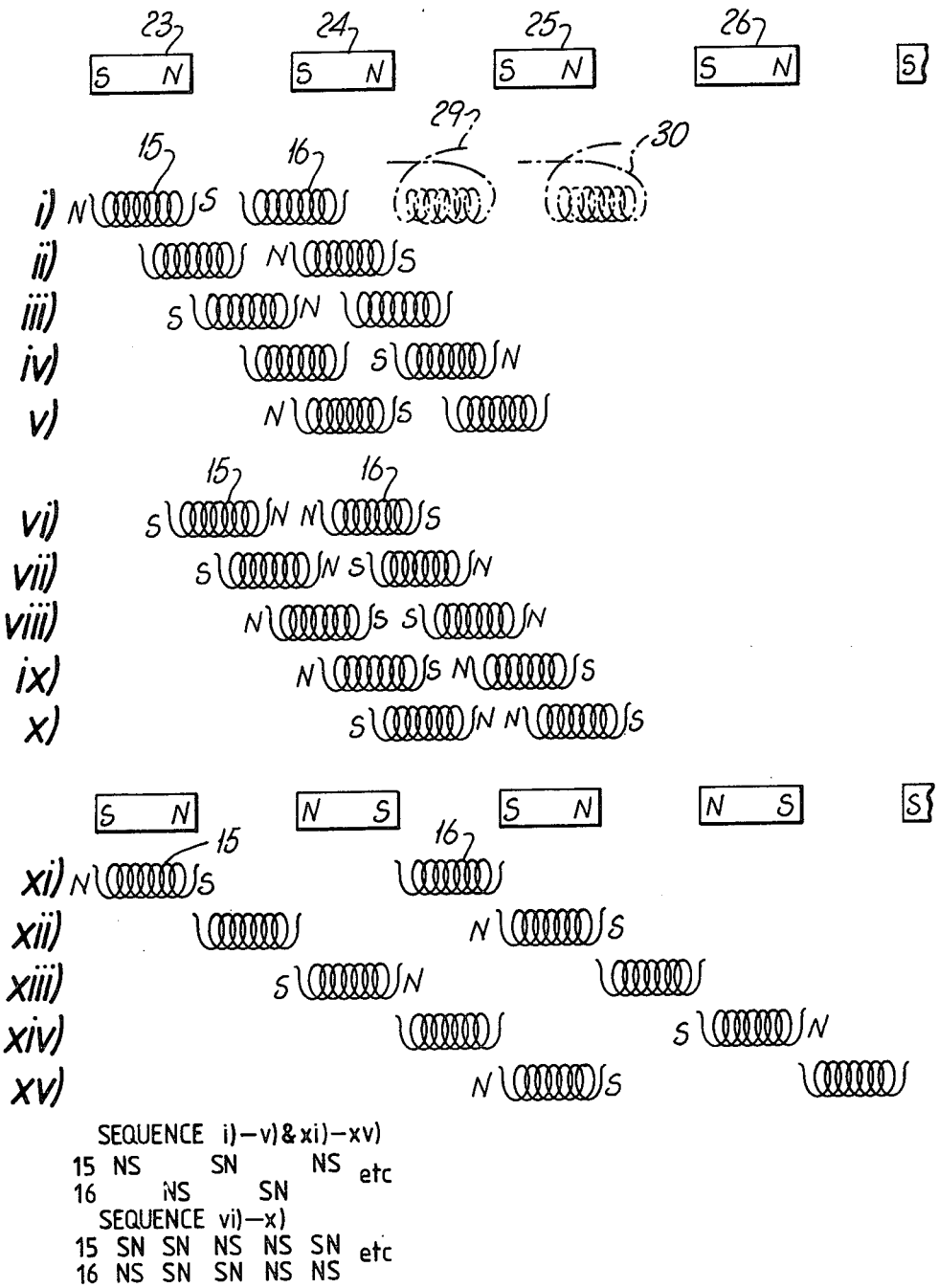
FIG. 3 is a sequence diagram showing progressive magnetisation patterns within the motor.

In a second mode of operation, the sequence of magnetic fields generated by the coils to cause movement to the right is shown in FIGS. 3(vi)–(x). In this sequence, both coils are energised, at any one moment, with the result that stable positions of the pairs of coils are off-set relative to the permanent magnets of the stator, as shown. In this mode, the coils again step to the right, but advantage is taken of the flux generated by both coils to increase the thrust available. In yet a further mode, the stepping sequences of FIGS. 3(i)–(iv) may be combined with those of 3(v)–(ix) to double the number of intermediate stable positions for a given travel of the armature.

The thrust derived from the armature may be increased by the addition of a further pair of coils, represented by the dotted outlines shown in FIG. 3(i) at 29 and 30. 29 is connected to 15, but provides flux of opposite polarity, and 30 is similarly connected to 16. In this arrangement, the amount of thrust available from the coils for a given length of armature is optimised. In yet a further arrangement, not shown, the coils 15, 16, 29 and 30 are each spaced by a quarter pole pitch to improve linearity of thrust. The sequence of magnetisation of the coils so spaced is appropriately controlled, in similar fashion to the sequences described above, to obtain motion of the four coils in a desired direction. Note, where stepping motion alone is required, as opposed to free running, it will be appreciated that no positional sensing is required to determine the appropriate energisation of the coils, in that the armature/stator pole configurations provide a number of stable positions, and thrust causing relative movement to and from such stable positions may be achieved by appropriate energisation of one or more of the armature coils, on the basis of an assumed position thereof.

The action of the form of linear motor shown in FIG. 1(d) will now be described in more detail with reference to FIGS. 3(x)–(xv). The coils are shown in a stable position in (xi) with coil 15 energised N S. Next, coil 16 is energised N S. The effect of this, within this magnetic configuration, is to cause movement of the coils, by a whole unit length, to the right as shown in (xii). 15 is then energised S N to cause the coils to move, again by a unit length, to the position shown in (xiii). 16 is then energised S N, causing further movement to the right as shown at (xiv). Finally, coil 15 is again energised N S; see (xv). The cycle is then complete. On account of the fact that the coils are displaced one from the other by an integral multiple of unit lengths, an important improvement may be made. Each coil 15 and 16 may be complemented in its effect by a reverse connected coil spaced respectively one unit therefrom, as shown in FIG. 4. In other words, in this example, 15' is so electrically connected to 15, and 16' to 16, that each causes a field of opposite polarity to its partner. In this arrangement, the entire space along a given length of the armature may be filled with coils, so greatly optimising the thrust available. (In the arrangement of FIGS. 1(a)–(c), it will be recalled, for a two-coil-set configuration, the coils must be spaced apart by half a unit length.) The configuration of magnetic poles as shown in FIG. 4, in which like poles are facing one another, greatly increases the flux cut by the coils, and obviates the necessity for the magnetic shroud of FIG. 2. The method of connection of the coils, and their spacing, as explained, yields a chording factor equal to unity. The combination of these factors can render a motor substantially more powerful than when the magnets lie in a NSNS . . . sequence.

It will be appreciated that construction of motors of the above described types is simple and inexpensive. The armature is formed by winding two or more coils on a simple former, which may form the bearing of the motor. The flux created by the coils directly intersects that of the permanent magnets. Expensive and bulky toothed laminations may be avoided, so giving rise to a particularly light armature with a corresponding fast speed of response. The stator is formed simply by inserting permanent magnets in a tube, interspaced by blocks of a suitable material e.g. wooden or plastics blocks. In the case of the motor of FIGS. 1(a)–(c), the outer tube of the motor, 17, effectively forming part of the stator of the motor, is inserted over the magnets and coil, and is held in position by coaxial mounting plates at each end of the motor. In the case of the motor of FIG. 1(d), the pattern of flux emanating from the magnets obviates the need for any shroud. If desired, the permanent magnets may be of a rare-earth e.g. samarium-cobalt type where very large thrusts are required for a particular application, and cooling of the coils for such applications may be effected by blasting air down a tubular air gap of the motor.

Referring to FIG. 4(b), a form of the linear motor is shown in which a stator 11 of the motor comprises coils 15 and 16 within a tube, and the armature comprises two annular magnets 12a and 12b. This configuration may be employed where it is desired to impart motion to the armature without connections thereto. In a variation of this arrangement, the magnets may lie within and move along a tube coaxially surrounded by the coils.

[In an embodiment of the motor where it is desired to use alternating current as a supply, as opposed to step-reversal functions of direct current, the permanent magnets may be replaced by coils fed from the A.C. source. The phase relationship between the stator alternating current, and the alternating currents flowing in the armature coils, is regulated according to the pattern above to achieve an identical effect.]

In the embodiments of FIG. 1, the pole pitch of the stator (and armature) is constant along its length, that is, the spacing between longitudinally adjacent poles, be they poles of the same magnet or facing poles of adjacent magnets, is the same. Alternative constructions are also envisaged in which the pole pitch varies along the motor, e.g. by having the spacing between adjacent stator magnets or coils different from their length. In these circumstances, the "pole pitch" should be taken as the length of one repeat of the stator pole pattern and it is this length which should differ from the "pole pitch" of the armature, which likewise may be constant along its length or vary in a similar manner as the stator.

Figure 5:
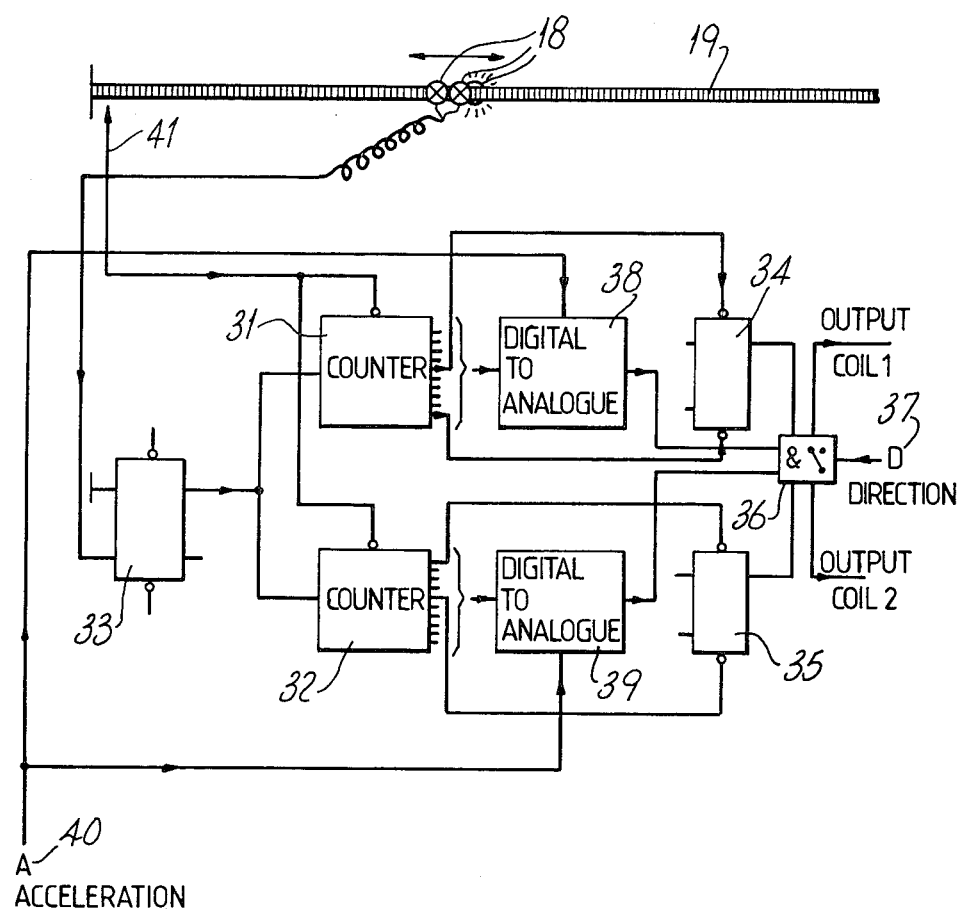
FIG. 5 is a block diagram showing a means of control of the motor.

For certain applications, it is desirable to control movement of the armature precisely, and to obtain acceleration and deceleration performances according to predetermined parameters. A particular method of control of the motor is now described with reference to FIG. 5.

A graticule, running along the length of the motor, is shown at 19. A light source/photocell combination for detecting gradations of the graticule is shown schematically at 18. The combination is affixed to the armature of the motor (not shown).

In order to effect control over the currents supplied to the coils of the motor, the output from the photocell is used to clock two cyclical counters 31 and 32 via one or more bistables, 33. The outputs of the counters are out of phase with one another to set and reset direction flip flops 34 and 35 according to the magnetisation sequence described earlier. The outputs of the direction flip flops further feed a summing and switching network 36, into which a direction indicator 37 is fed. The switching network provides two outputs controlling the direction and amplitude of currents fed to the coils of the motor. As well as controlling the direction flip flops, the values stored within the counters are fed respectively to two digital to analogue converters 38 and 39. The outputs of these are also fed to the network 36. Furthermore, a signal representing an acceleration/deceleration component 40, is fed to the two converters 38 and 39.

The action of the circuitry is as follows. The response of the motor, when simple reversals of currents to its coils are effected, is uneven but satisfactory for some applications. In order to improve linearity of thrust, the digital to analogue converters modify the amplitude of currents fed to the coils, according to their position, by appropriately modulating the output from the summing network 36, so that during relative movement of the armature and stator the net thrust force is substantially independent of their relative position. The outputs from the flip flops 34 and 35 govern the direction of current supplied by the network 36 to the two coils, but this is further subject to the direction indicator, 37. According to a desired displacement, the acceleration/deceleration component 40 further regulates the output of the converters. This component may over-ride the outputs of the counters as required for any particular displacement. The counters may be cycled when power is first applied to the motor to obtain movement therefrom, and are reset by a clock pulse 41 obtained from an end-stop indicator located on the graticule at a switching point of the magnetic sequence. A known "reset" value for the counters may be obtained by energising both coils simultaneously, in order that a known stable position is assumed thereby. Thus, control of direction, linearity of thrust and acceleration is established. Other methods of control will be apparent to those skilled in the art, such as energising the coils from current rather than voltage sources.

Instead of the commutation being effected as described above on the basis of the detected relative position of the stator and armature, where only a stepping function is required, it may be sufficient as explained earlier to commutate the coil currents on the basis of the assumed or calculated relative position.

In applications where it is desired to achieve high thrusts which are also substantially even along the length of the motor, regardless of the relative position of the stator and armature, several coils may be used which are each separated by varying spaces in order that energisation of appropriate pair(s) effects closely following thrusts from the coils which so provides a more linear response.

I claim:

1. A linear motor comprising an armature and a stator each movable relative to one another along a lengthwise axis of the motor and each having a plurality of magnetic flux generators, which are each coaxial with said axis, each plurality providing a respective sequence of north and south poles along the length of said axis, one of the sequences being relatively long and spanning the range of desired relative axial movement of the armature and stator and the other being relatively short, the generators of one sequence being mutually axially spaced to provide gaps therebetween and having permanent magnets as the flux generators thereof and the generators of the other sequence comprising at least two independently energisable coils as the flux generators thereof, and means to enable the energisation of said coils, the pole pitches of the stator and the armature being different from one another so that, when one such coil overlies a flux generator of said one sequence, an independently energisable coil of the second sequence overlies the gap between an adjacent pair of flux generators of said one sequence and vice versa whereby with appropriate energisation of said coils by said means the difference in pole pitch of the armature and stator can result, in use, in a net thrust of the armature relative to the stator in a desired direction at any location within said range of relative movement.

2. A motor according to claim 1 wherein the stator comprises a plurality of substantially coaxial regularly mutually spaced permanent magnets, and the armature comprises two or more coils coaxially surrounding the magnets and which have a mutual spacing different from that of the magnets.

3. A motor according to claim 1 further comprising a position detector arranged to detect the relative position of the armature and stator and wherein the coil energisation means is arranged to respond to the output of the position detector to appropriately energise the coils to effect a desired relative movement of the armature and stator.

4. A motor according to claim 3 and including control circuitry for controlling in closed loop fashion the relative velocity and/or position of the armature and stator, the control circuitry including said coil energisation means.

5. A motor according to claim 4 wherein the closed loop velocity or positional control is carried out using the position detector for feedback.

6. A motor according to claim 3, 4, or 5 wherein the position detector includes an optical graticule on one of the armature and stator and at least one photoresponsive element on the other of the armature and stator.

7. A motor according to any one of claims 3 to 5, wherein, in use, a weighting factor derived from the output of the position detector is applied to the corresponding coil current(s) to improve linearity of thrust imparted by the armature.

8. A motor according to claim 1 wherein said means is arranged to control the energisation of the coils so that a desired thrust/position or thrust/time profile is achieved.

9. A motor according to claim 1 wherein said means is arranged to energise the coils with D.C. currents which, in use, are appropriately controlled by electronic or electromechanical means as the relative position of the armature and stator varies, to maintain the desired direction of thrust.

10. A motor according to claim 1 wherein said means is arranged to apply to the coils pulses having appropriate duration, and whose pulse rate and/or amplitude may be appropriately modulated to achieve a desired thrust characteristic.

11. A motor according to claim 1 wherein one of the stator and armature is provided with coils to provide the poles thereof and the other of the stator and armature has permanent magnets to provide the poles thereof, the permanent magnets being arranged in a N S S N N S . . . sequence.

12. A motor according to claim 11 wherein the permanent magnets are spaced from one another along the lengths of the motor by distances substantially equal to their pole pitch and the coils are arranged in at least two sets, coils of the two sets alternating along the length of the motor, the pitch of adjacent coils being substantially equal to the pole pitch of the permanent magnets.

13. A motor according to claim 1 wherein the fields of the stator and armature are provided by coils supplied with alternating current and said means is arranged to appropriately vary the phase relationship between the currents to the coils of the armature and stator as the relative positions of the stator and armature change to obtain thrust in a desired direction.

14. A motor according to claim 1 wherein to produce the poles thereof the armature has two sets of coils, coils of the two sets being of substantially equal length and arranged in alternation along the length of the motor, the coils of different sets being mutually spaced apart by substantially one half of the pole pitch of the stator.

15. A linear motor comprising: an armature and a stator movable relative to one another along a lengthwise axis of the motor and each having a plurality of magnetic flux generators, which are coaxial with said axis, each plurality providing a respective sequence of north and south poles along said axis, the flux generators of one of the pluralities being axially mutually spaced, the flux generators of at least one of the armature and stator having at least two coils to produce the poles thereof, one of the sequences having like poles of adjacent flux generators spaced apart and facing one another; and means to enable the energisation of said coils, the pole pitches of the stator and the armature being different from one another, such that with appropriate energisation of said coils by said means the difference in pole pitch of the armature and stator can result, in use, in a net thrust of the armature relative to the stator in a desired direction at any location within a range of relative longtidudinal positions of the armature and stator, the magnetic fields produced by the stator and armature interacting in a cyclically repeating fashion during movement across such range.

16. A linear motor comprising an armature and a stator each adapted to provide a sequence of north and south poles along the length of the motor, at least one of the armature and stator having at least two coils to produce the poles thereof, and means to enable the energisation of said coils, the pole pitches of the stator and the armature being different from one another such that with appropriate energisation of said coils by said means the difference in pole pitch of the armature and stator can result, in use, in a net thrust of the armature relative to the stator in a desired direction at any location within a range of relative longitudinal positions of the armature and stator; and wherein one of the stator and armature is provided with coils to provide the poles thereof and the other of the stator and armature has permanent magnets to provide the poles thereof, the permanent magnets being spaced apart and arranged in a NSSNNS . . . sequence.

17. A motor according to claim 16 wherein the permanent magnets are spaced from one another along the lengths of the motor by distance substantially equal to their pole pitch and the coils are arranged in at least two sets, coils of the two sets alternating along the length of the motor, the pitch of adjacent coils being substantially equal to the pole pitch of the permanent magnets.

18. A linear motor comprising an armature and a stator movable relative to one another along a lengthwise axis and having a plurality of magnetic flux generators, which one each coaxial with said axis and providing a sequence of north and south poles along the length of said axis, at least one of the armature and stator having at least two coils to produce the poles thereof, and means to enable the energisation of said coils, the pole pitches of the stator and the armature being different from one another such that with appropriate energisation of said coils by said means the difference in pole pitch of the armature and stator can result, in use, in a net thrust of the armature relative to the stator in a desired direction at any location within a range of relative longitudinal positions of the armature and stator; and wherein one of the stator and armature is provided with coils to provide the poles thereof and the other of the stator and armature has permanent magnets to provide the poles thereof, the permanent magnets being spaced from one another along the lengths of the motor by distance substantially equal to their pole pitch and the coils are arranged in at least two sets, coils of the two sets alternating along the length of the motor, the pitch of adjacent coils being substantially equal to the pole pitch of the permanent magnets.

19. A linear motor comprising an armature and a stator each movable relative to one another along a lengthwise axis of the motor and each having a plurality of magnetic flux generators, which are each coaxial with said axis, each plurality providing a respective sequence of north and south poles along the length of said axis, one of the sequences being relatively long and spanning the range of desired relative axial movement of the armature and stator and the other being relatively short, the generators of one sequence being mutually axially spaced, one of the armature and stator having at least two coils as the flux generators thereof and the other of the armature and stator having permanent magnets as the flux generators thereof, and means to enable the energisation of said coils, the permanent magnets being arranged in a NS.SN.NS . . . sequence and being spaced from one another along the length of the motor by distances substantially equal to their pole pitch and the coils being arranged in two sets, coils of the two sets alternating along the length of the motor, the pitch of adjacent coils being substantially equal to the pole pitch of the permanent magnets whereby the pole pitches of the stator and the armature are different from one another and whereby with appropriate energisation of said coils by said means, the difference in pole pitch of the armature and stator can result, in use, in a net thrust of the armature relative to the stator in a desired direction at any location within said range of relative movement.

20. A linear motor comprising an armature and a stator each adapted to provide a sequence of north and south poles along the length of the motor, at least one of the armature and stator having at least two coils to produce the poles thereof, and means to enable the energisation of said coils, the pole pitches of the stator and the armature being different from one another such that with appropriate energisation of said coils by said means the difference in pole pitch of the armature and stator can result, in use, in a net thrust of the armature relative to the stator in a desired direction at any location within a range of relative longitudinal positions of the armature and stator; and wherein one of the stator and armature is provided with coils to provide the poles thereof and the other of the stator and armature has permanent magnets to provide the poles thereof, the permanent magnets being arranged in a NSSNNS . . . sequence and being spaced from one another along the lengths of the motor by distance substantially equal to their pole pitch and the coils are arranged in at least two sets, coils of the two sets alternating along the length of the motor, the pitch of adjacent coils being substantially equal to the pole pitch of the permanent magnets.

* * * * *